United States Patent [19]

Gennodie et al.

[11] Patent Number: 4,920,628
[45] Date of Patent: May 1, 1990

[54] REPLACEMENT METHOD FOR A RAILROAD CAR BRAKE TREAD UNIT USING REMOVABLE LIFT FIXTURE

[76] Inventors: James Gennodie, 16 North St., Montrose, N.Y. 10548; John Di Domenico, Tripp St., R.F.D. 3, Mount Kisco, N.Y. 10549

[21] Appl. No.: 365,892

[22] Filed: Jun. 14, 1989

[51] Int. Cl.⁵ ..................... B23P 19/04; B23Q 3/16
[52] U.S. Cl. ..................... 29/402.08; 29/401.1; 29/402.01; 29/402.03; 269/17
[58] Field of Search ............. 29/401.1, 402.01, 402.03, 29/402.08, 464, 468, 426.5; 254/133, 134; 269/17

[56] References Cited

U.S. PATENT DOCUMENTS 2,825,477  3/1958  Ross ..................... 269/17 X
3,581,671  6/1971  Hart ..................... 269/17 X
4,532,689  8/1985  Harder et al. ..................... 29/426.5

FOREIGN PATENT DOCUMENTS 638579  9/1983  Switzerland ..................... 29/402.08

Primary Examiner—Joseph M. Gorski
Assistant Examiner—Peter Dungba Vo

[57] ABSTRACT

Railroad car repair or servicing method using a fork lift of the type having ascending and decending degrees of movement that is equipped with an attachment for supporting a railroad car brake tread unit in which a replacement said brake tread unit is attached to the railroad car by advantageously using said ascending and descending fork movements to thereby obviate prior art possible back-injuring procedures required of the repair shop employees.

2 Claims, 2 Drawing Sheets

REPLACEMENT METHOD FOR A RAILROAD CAR BRAKE TREAD UNIT USING REMOVABLE LIFT FIXTURE

The present invention relates generally to the servicing of railroad cars, and more particularly to an improved and facilitated method of replacing a railroad car brake tread unit, which is of the type that is used contemplates the application under pneumatic pressure of a brake shoe against a wheel surface, and thus due to the resulting wear, requires frequent replacement. Moreover, the brake tread unit, which typically weighs between 150 to 200 pounds, is supported in depending relation beneath the railroad car, and thus is difficult to reach, and is both heavy and cumbersome, making it difficult to manually handle during the replacement process.

EXAMPLE OF THE PRIOR ART

In U.S. Pat. No. 2,431,589 issued to Shuler on Nov. 25, 1947, a heavy and cumbersome airplane propeller is effectively handled using a fork lift with an attachment operatively disposed on the forks thereof to support and transport the propeller incident to its being mounted on the airplane drive shaft. It is thus known from this and other prior patents that the use of fork lifts can significantly obviate manual handling of heavy equipment during transport from a supply site to a point of use.

SUMMARY OF THE INVENTION

It is now proposed in accordance with the present invention to effectively use a fork lift not only for transporting a heavy and cumbersome piece of equipment, in the specific form of a railroad car brake tread unit, but to significantly facilitate the removal and replacement of the brake tread unit from its almost inaccessible supported depending relation beneath the railroad car, and thus eliminate a heretofore troublesome servicing problem of railroad cars. Obviated by the within inventive replacement method for railroad car brake tread units is any manual handling thereof which heretofore often caused back injuries to the repair shop employees.

It is thus generally an object of the present invention to overcome the foregoing and other shortcomings of prior art manual procedures for replacing railroad car brake tread units. More particularly, it is an object to use a fork lift with an appropriate adaptive attachment to support the brake tread unit, and by advantageously using the ascending and descending degrees of movement of the forks achieve detachment of a worn, and attachment of a replacement brake tread unit to the railroad car, all with little or no possible back-injuring procedures required of the repair shop employees.

The description of the invention which follows, together with the accompanying drawings should not be construed as limiting to the example shown and described, because those skilled in the art to which this invention appertains will be able to device other forms thereof within the ambit of the appended claims.

DETAILED DESCRIPTION OF A PREFERRED EMBODIMENT

Figure 1:
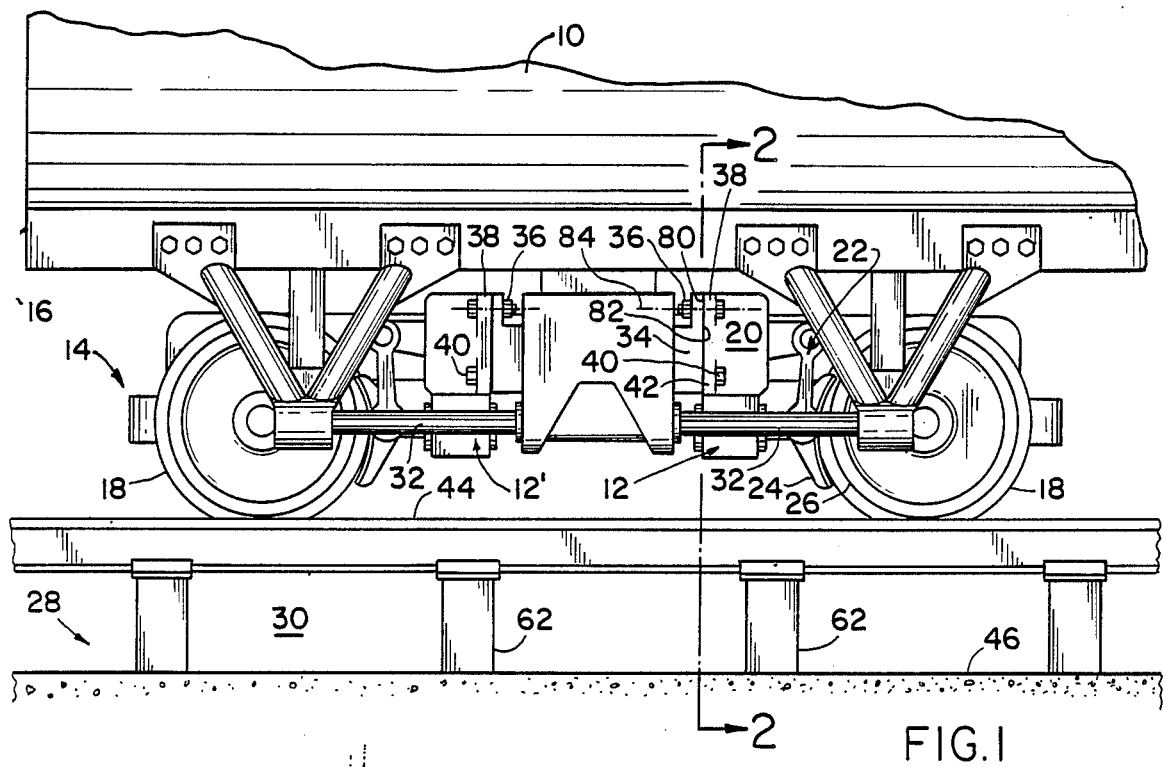
FIG. 1 is a partial side elevation of a conventional railroad car illustrating the position of a so-called truck assembly thereof as it would be presented for servicing in a repair shop.

FIG. 1 is provided to show in a greatly simplified side elevational view, one end of a railroad car 10 in order to demonstrate the facilitated method of servicing or repairing same, using a conventional fork lift. More particularly, periodic servicing of a railroad car 10 requires that the brake tread unit 12 be replaced. As is well understood, each car 10 has a four wheel truck 14 near each of its two ends 16, and each of the four wheels 18 thereon has an associated brake tread unit 12. Typically each brake treat unit comprises a cast housing 20 which supports a linkage 22. Linkage 22 permits a brake shoe 24 to be pneumatically applied against wheel surface 26 to slow or stop car 10 during use. To achieve this function, each unit 12, depending on the railroad car model, can typically weigh between 150 and 200 pounds.

A current practice used to remove and replace the brake tread units 12 contemplates that the entire truck 14 be removed from car 10. Thereafter use is made of pit tracks 28, namely a track 44 with a pit 30 below it, thus allowing mechanics to work beneath the car 10. Even using the pit track technique 28 is not completely satisfactory, because due to location and weight, the handling of the brake tread units 12 is a difficult and dangerous operation at best.

Figure 2:
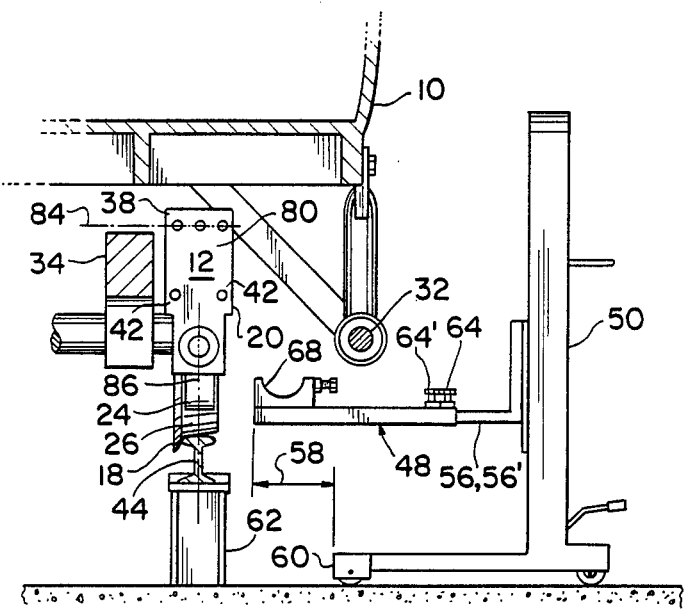
FIG. 2 is a sectional view as taken along line 2—2 of FIG. 1, to which figure there has been added in side elevation a conventional fork lift to be used in the servicing of said railroad car truck assembly.

One major obstacle contributing to this undesirable situation is the location of the so-called railroad car radius rod 32, (a major component of the suspension system between the main frame of car 10 and truck 14, which cannot be removed) which as shown in FIGS. 1 and 2, is directly outboard of each of the brake tread units 12. The radius rod 32, thus due to its location, is a major blocking heretofore complicating the replacement of the brake tread unit 12, other than using the pit track technique 28. The within inventive brake tread unit replacement method overcomes this prior art problem, all as will now be described in detail.

At its upper end, each brake tread unit 12 is fastened to the frame 34 of truck 14 by three bolts 36 which pass through holes in a housing 20 flanges 38. Additionally, the current practice is to use two machine screws 40 which are passed through holes in housing flanges 42 and threaded into a truck frame 34. Thus, in any replacement method, after screws 40 are removed and bolts 36 are loosened and removed, each brake tread unit 12 must be supported and maneuvered away from frame 34 and wheel surface 26, and then moved through the clearance inbetween the radius rod 32 and the track 44.

Figure 4:
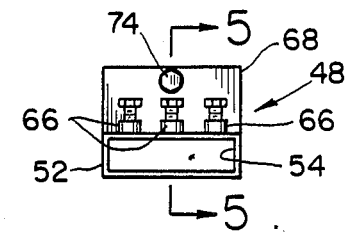
FIG. 4 is an end sectional view taken along line 4—4 of FIG. 3.
Figure 3:
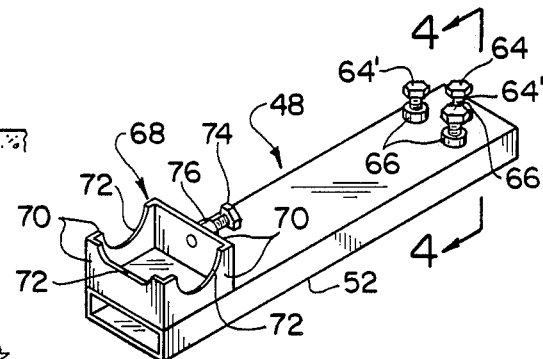
FIG. 3 is a perspective view of a fork life component according to the present invention.
Figure 5:
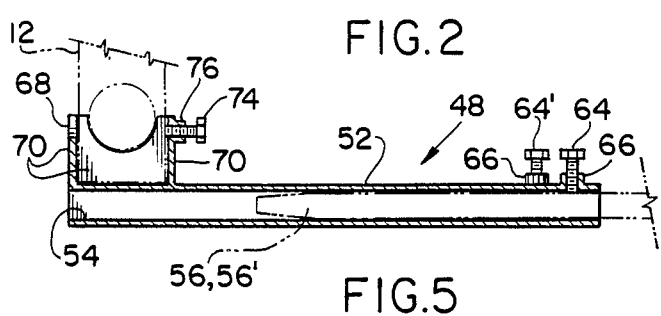
FIG. 5 is a longitudinal sectional view taken along line 5—5 of FIG. 4.
Figure 8:
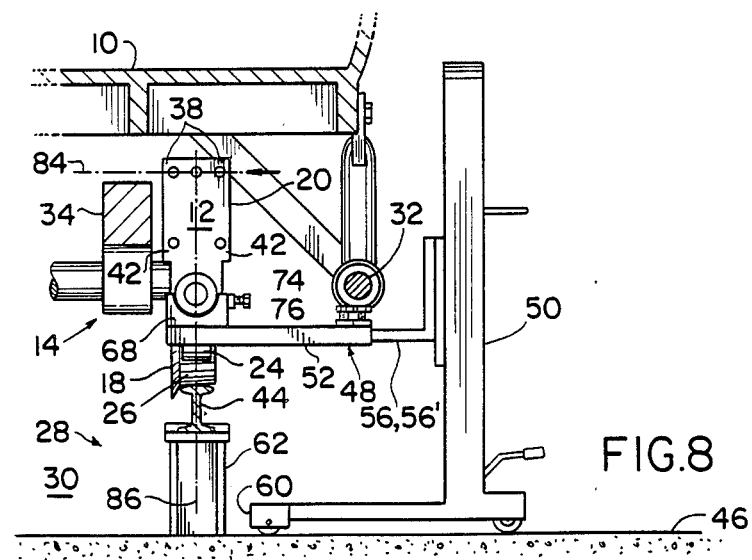

FIG. 3,4 and 5 show in sequence, the steps according to the present invention in which a component 48, used as an attachment for a fork life 50 facilitates the replacement of a brake tread unit 12. Fork lift 50 is preferably of the easily maneuverable, manually operated, foot pump type. The attachment device 48 has a main body member 42, rectangular in cross section (see FIG. 5), with a corresponding through rectangular aperture 54. Aperture 54 is sized to be fitted about one larger fork 56, or two smaller, side-by-side forks 56', on a fork lift 50 of conventional and well understood construction and operational mode. In preparation for use, device 48 is positioned on fork 56 (or forks 56') with an adequate overhang 58 to avoid interference of the front end 60 of lift 50 with track support member 62 when device 48 is in its proper position for brake tread unit replacement use, as best shown in FIGS. 2 and 8. After allowing for an appropriate length of overhang 58, the device 48 can be clamped to a single large fork 56 with screw 65, or to forks 56' with screws 64', as the case may be. Screws 64 and 64' are made to cooperate with threaded collars 66 welded to member 52, as best seen in FIG. 5.

On the end opposite the clamping screw 64, 64' of member 52, a brake tread unit holding box is fashioned of four vertical walls 70 which are welded thereon. Walls 70 are of appropriate dimensions and contours to conform snugly about the lower end of the brake tread unit 12. As an added precaution, a lock screw 74 is provided so as to be secured against the brake tread unit during the handling and transport thereof while on fork lift 50. Lock screw 74 is threadable disposed in treaded sleeve 76 so as to engage, as best seen in FIG. 5, the brake tread unit. It is noted that a "lefthand" brake tread unit 12' (FIG. 1) will be as readily received by holding box 68 as a "righthand" brake tread unit 12.

Figure 6:
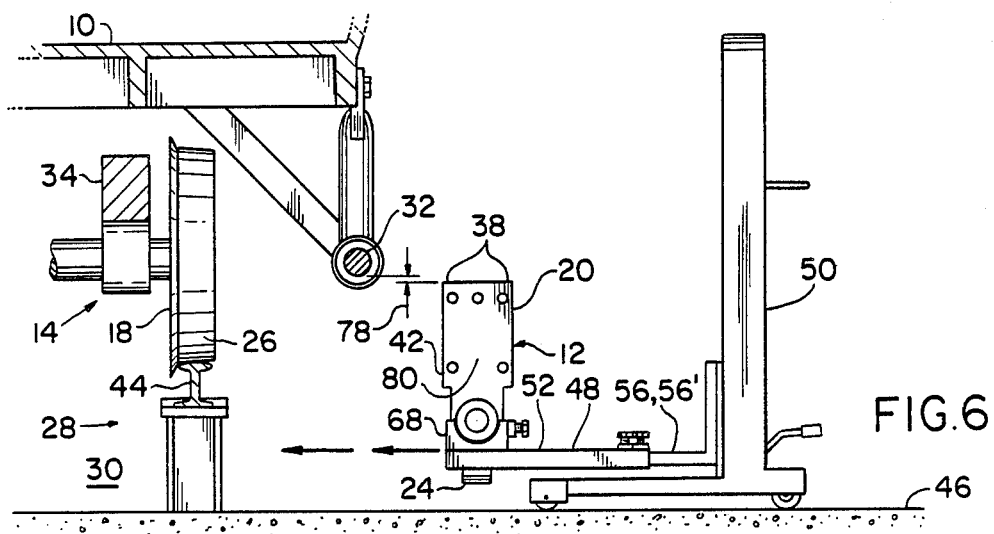
FIG. 6, 7 and 8 are each sectional views as seen from the same perspective as FIG. 2 and showing the sequence of use of the fork lift during the servicing of said railroad car.
Figure 7:
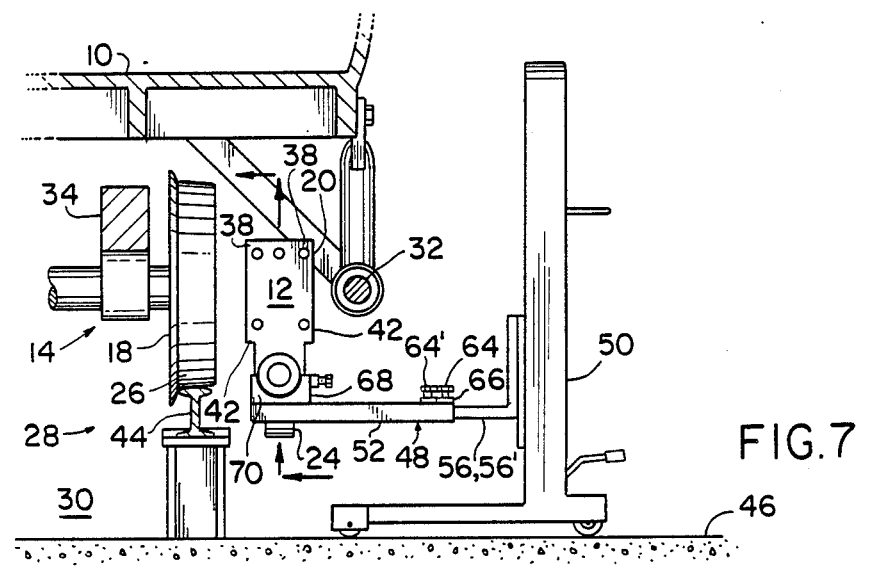

The use of device 48 in combination with a fork lift 50 in replacing a brake tread unit is best understood in reference to FIGS. 6, 7 and 8, and will now, be described.

In FIG. 6 it will be understood that a new or rebuilt brake tread unit 12 is shown in an initial clearance position from the car 10, but ready for installation in its operative depending position beneath the railroad car 10. Device 48 is locked to fork 56 (or forks 56') by screw 64 (or screws 64') on fork lift 50. Brake tread unit 12 is also preferably locked in the brake tread unit-engaging or holding box 68 by screw 74, preferable at the site where the unit 12 is supplied. Using a vertical positioning of fork 56, i.e. movements in ascending and descending paths, readily allows movement through the clearance 78 between the top of brake tread unit 12 and the bottom of radius rod 32. Fork lift 50 is thereafter selectively operated up and down, as needed, so that mounting surface 80 on brake tread unit 12 is aligned with its counterpart 82 (FIG. 1) on truck frame 34. At this point, fork lift 50 is moved forward so that brake tread unit 12 is approximately halfway between track 44 and radius rod 32 (FIG. 7), whereupon brake tread unit 12 is then elevated so that the holes provided thereon for bolts 36 are approximately at level 84 of the mount or railroad car support surface 82. It should be readily appreciated that further forward movement of fork lift 50 (FIG. 8) will center unit 12 over center line 86 of track 44 and thus will result in the holes for bolts 36 aligning with similar bolt holes in the truck frame surface 82. Position-adjusting movements or so-called "jockeying" of the supported brake tread unit 12 will allow for a loose fitting of upper bolts 36. Further subsequent tightening of the bolts 36 is contemplated after alignment of the holes for screws 40 with their corresponding threaded holes in frame support surface 82.

After final tightening of bolts 36 and screws 40, the brake tread unit is freed of the fork lift 50 by merely loosening of the lock screw 74, whereupon device 48 on fork lift 50 can be lowered free of brake tread unit 12 and then backed off or maneuvered away from the railroad car truck 14.

Reversal of the just described steps of the aforedescribed procedure is, of course, employed when removing a brake tread unit 12 for replacement. The removal or installation procedure will be understood to include the appropriate disconnecting and connecting of electrical and pneumatic lines (not shown), which, for simplicity and because it is not a necessary part of the within inventive method, has not been described.

It should also be appreciated that the size and contour of holding box 68 should be selected to fit the particular model brake tread unit 12 involved, and thus may vary. However, the size of screws 64, 64' and 74 on device 48 are purposely made the same size as the bolts 36 and screws 40, so that only one size wrench need be used during the replacement method.

It should be readily appreciated from the foregoing that there has been described a noteworthy method of replacing a railroad car brake tread unit in which a fork lift effectively handles the support, movement and positioning of the brake tread unit and thereby obviates any significant manual handling thereof.

While the particular railroad car brake tread unit replacement method herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. A method for replacing a railroad car brake tread unit operably threadably bolted in depending relation beneath a railroad car using a vertically ascending and descending fork lift having a base for supporting the fork lift, said replacement method comprising the steps of: affixing a lift fixture to one of said fork lift forks, said lift fixture having a hollow arm adapted to be supported by at least one of said forks, said lift fixture having an upper surface portion conforming to at least a portion of a lower surface of said brake tread unit located at a distal end of said hollow arm, said affixing step comprising slidably receiving and securely assembling said one fork into said hollow arm such that said lift fixture extends outwardly beyond the base of said lift fork, moving said fork lift beneath said railroad car with said lift fixture in alignment beneath said brake tread unit, moving said fork lift in an ascending path, thereby establishing engagement between said brake tread unit and said lift fixture, unbolting said brake tread unit free of a railroad car supporting structure, moving said lift fixture with said brake tread supported upon said lift fixture in a descending path, moving said fork lift to a clearance position away from said railroad car and removing the brake tread unit from said lift fixture, placing a substitute break tread unit in position on said lift fixture for attachment in depending relation beneath said railroad car, moving said fork lift with said substitute brake tread unit thereon beneath said railroad car, aligning said substitute brake tread unit with the railroad car supporting structure for same, moving said lift fixture in an ascending path, thereby positioning said substitute brake tread unit thereon in adjacent position to said railroad car supporting structure, simultaneously bolting and position-adjusting said brake tread unit with respect to said railroad car supporting structure by corresponding select ascending and descending movements of said lift fixture, thereby establishing the threadably bolted attached position of said substitute brake tread unit in said depending relation beneath said railroad car, and moving said lift fixture in a descending path, there disengaging said fixture from said substitute brake tread unit whereby said brake tread unit is replaced with optimum minimal manual handling thereof.

2. The method of claim 1 further including the step of rigidly affixing said brake tread units to said lift fixture by engaging clamp means with a portion of said brake tread units.

* * * * *